United States Patent Office 2,881,173
Patented Apr. 7, 1959

2,881,173
BASIC ETHERS OF HYDROXY ANTHRAQUINONES

Wilhelm Wenner, Upper Montclair, N.J., assignor to Hoffmann-La Roche Inc., Nutley, N.J., a corporation of New Jersey No Drawing. Application February 14, 1957
Serial No. 640,088

17 Claims. (Cl. 260—294.7)

This invention relates to basic ethers of hydroxy anthraquinones. More particularly, the invention relates to mono- and bis tertiary amino alkyl derivatives of mono- and dihydroxy anthraquinones, respectively. The novel bases may be represented by the following structural formula (I)

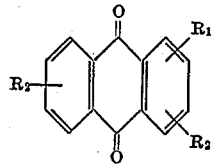

wherein $R_1$ represents a tertiary amino alkoxy group and $R_2$ represents hydrogen or a tertiary amino alkoxy group, at least one $R_2$ representing hydrogen.

Either one or both substituents represented by $R_2$ may represent hydrogen so that anthraquinone derivatives containing only one or two basic ether groups are contemplated. Also included within the scope of the invention are acid addition salts and quaternary ammonium salts of the bases represented by the above formula.

The tertiary amino alkoxy groups represented by $R_1$ and $R_2$ in the above formula include dialkylamino alkoxy groups and nitrogen heterocyclic alkoxy groups wherein the nitrogen atom of the heterocyclic ring is attached to a carbon atom of the alkoxy group. The alkyl groups in the dialkylamino alkoxy substituent are preferably straight chain and branched chain lower alkyl groups. The alkoxy portion of the basic ether substituent includes straight chain and branched chain alkylene groups, preferably lower alkylene, joining the oxygen and nitrogen atoms.

Illustrative of the dialkylamino alkoxy substituents are dimethylamino methoxy, diethylamino ethoxy, dimethylamino propoxy, dimethylamino isopropoxy, diethylamino propoxy, dimethylamino butoxy, diethylamino butoxy, diethylamino isobutoxy, dipropylamino butoxy, etc. The heterocyclic radicals of the basic ether substituents are preferably 5 or 6-membered saturated nitrogen monoheterocyclics, making up basic ether groups such as morpholinyl alkoxy, piperidyl alkoxy, pyrrolidyl alkoxy, etc. The basic ether groups represented by $R_1$ and $R_2$ may be the same or different.

Preferred bases of the invention may be described as including compounds of Formula I above wherein $R_1$ represents a radical selected from the group consisting of di-lower alkylamino alkoxy, piperidyl alkoxy, morpholinyl alkoxy and pyrrolidyl alkoxy and $R_2$ represents a radical selected from the group consisting of hydrogen, di-lower alkylamino alkoxy, piperidyl alkoxy, morpholinyl alkoxy and pyrrolidyl alkoxy, at least one $R_2$ representing hydrogen, i.e. there is at least one but not more than two basic ether groups in the molecule. Within that preferred class of compounds those answering to the Formula I above wherein $R_1$ is in the 1-position are especially preferred. In particular, compounds having a basic ether group in the 1-position and corresponding to the following structural formulae constitute the most preferred groups of this invention:

(II)

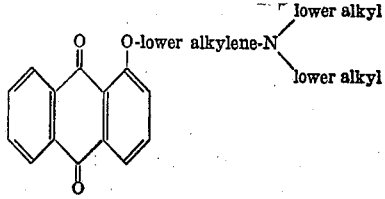

(III)

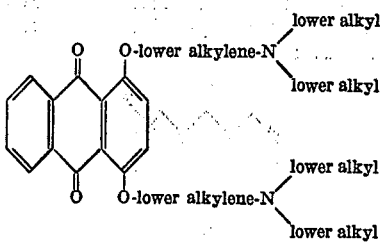

(IV)

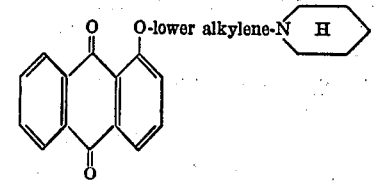

(V)

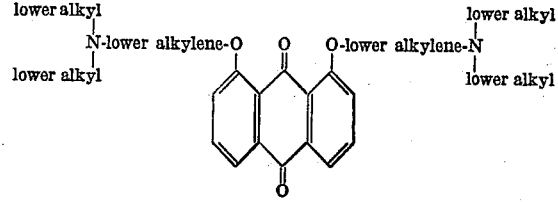

(VI)

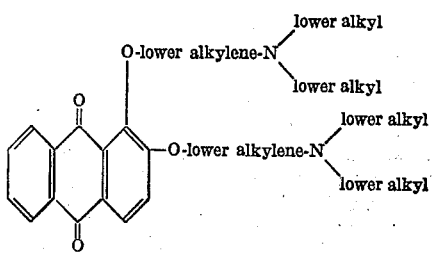

The compounds of this invention are produced by converting a mono- or dihydroxy anthraquinone into a salt thereof, preferably an alkali metal salt, and reacting the salt produced with a tertiary amino alkyl halide. The reaction of the salt of the hydroxy anthraquinone and the tertiary amino alkyl halide is preferably effected in an organic hydrocarbon solvent such as benzene, toluene or xylene. The salt of the mono- or dihydroxy anthraquinone may be isolated prior to reaction with the amino alkyl halide or it may be formed directly in the reaction mixture from the hydroxy anthraquinone and an alkali hydroxide. The latter procedure is preferred, e.g. the salt of the hydroxy anthraquinone is produced by suspending the dihydroxy anthraquinone in an organic hydrocarbon solvent and adding a concentrated aqueous solution of a base such as ammonium hydroxide or alkali metal hydroxide such as sodium or potassium hydroxide. Water is removed from the reaction mixture by refluxing and when the water is separated, the tertiary amino alkyl halide dissolved in toluene or xylene is added to the reaction mixture.

When a dihydroxy anthraquinone is utilized as starting material, the addition of about one molar proportion of base and then about one molar proportion of tertiary amino alkyl halide will result in the production primarily of an anthraquinone derivative containing one —O— metal group and one basic ether group, respectively. The second hydroxyl group remains substantially unchanged. If, however, about two molar proportions of base and tertiary amino alkyl halide are used per molar proportion of dihydroxy anthraquinone, both hydroxyl groups undergo reaction and an anthraquinone derivative containing two basic ether groups is primarily produced.

The mono hydroxy-mono tertiary amino alkoxy anthraquinone produced as described above may be isolated and, if desired, may be subsequently reacted with a second molar proportion of base and of tertiary amino alkyl halide to produce an anthraquinone derivative containing two basic ether groups. The intermediate compounds which have the structural formula (VII)

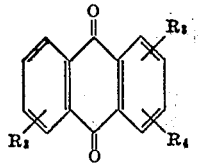

wherein $R_3$ represents a tertiary amino alkoxy group, one $R_4$ represents hydrogen and the other $R_4$ represents hydroxy
are also within the scope of this invention. $R_3$ represents the same tertiary amino alkoxy groups represented by $R_1$ and $R_2$ as described in relation to Formula I above.

The compounds described above form acid addition salts by reaction with a variety of inorganic and organic acids and form quaternary ammonium salts by reaction with quaternizing agents. Illustrative acid addition salts include hydrohalides such as the hydrochloride, hydrobromide, hydroiodide, etc., sulfate, phosphate, nitrate, toluene sulfonate, citrate, oxalate, ascorbate, etc. Quaternary ammonium salts may be formed with alkyl halides, preferably lower alkyl halides such as methyl chloride, methyl bromide, methyl iodide, ethyl iodide, propyl chloride, propyl bromide, butyl chloride and butyl bromide, alkenyl halides such as allyl bromide, crotyl bromide, etc., aralkyl halides such as benzyl chloride, benzyl bromide, methoxybenzyl chloride, phenethyl chloride, etc. and alkyl sulfates such as dimethyl sulfate, diethyl sulfate, etc. Pharmaceutically acceptable salts such as those illustrated above and salts containing one or more acid or quaternary groups in the molecule are contemplated.

The compounds of this invention have utility as anthelmintics and antiprotozoan agents being useful in combatting infections caused by organisms such as *Syphacia obvelata* and *Trichomonas vaginalis*. The compounds may be administered orally or parenterally or, in some cases, topically by combining therapeutic doses with conventional carriers and/or excipients to prepare tablets, injectables or ointments, as the case may be, according to accepted pharmaceutical practice.

The following examples are illustrative of the invention. All temperatures are expressed in degrees centigrade.

*Example 1*

67 g. of 1-hydroxyanthraquinone were stirred with 1000 cc. of water. A solution of 34 g. of sodium hydroxide in 100 cc. of water was added. After 2 hours the sodium salt of 1-hydroxyanthraquinone was filtered, washed with 300 cc. of alcohol and then with 300 cc. of acetone and dried at 50°.

75 g. of the sodium salt of 1-hydroxyanthraquinone were stirred with 300 cc. of toluene. A solution of 45 g. of 2-diethylaminoethyl chloride in 100 cc. toluene was added. The mixture was refluxed with stirring for 8 hours. After cooling it was filtered. The filtrate was extracted repeatedly with dilute sodium hydroxide, washed with water, and then extracted with dilute hydrochloric acid. The acid extract was made alkaline with ammonia. An oil separated which crystallized on standing. It was filtered and dried. The crude 1-(2-diethylaminoethoxy)-anthraquinone base melted at 45–50°. The hydrochloride was prepared by dissolving the base in about 4 volumes of alcohol and adding alcoholic hydrochloric acid in excess. The hydrochloride crystallized slowly. It was filtered after standing overnight. The compound was recrystallized from about 20 volumes of alcohol. It melted at 227–228°.

5 g. of 1-(2-diethylaminoethoxy)anthraquinone were dissolved in 50 cc. alcohol. After addition of 3 cc. of methyl iodide, the mixture was allowed to stand at room temperature. The methiodide crystallized slowly. It was filtered after 3 days and was recrystallized from about 300 cc. alcohol. The pure methiodide of 1-(2-diethylaminoethoxy)anthraquinone melted at 197–199°.

8 g. of 1-(2-diethylaminoethoxy)anthraquinone were dissolved in 50 cc. of methanol and mixed with 20 cc. of an 18% solution of methyl bromide in methanol. After standing at room temperature for one day, ether was slowly added. The methobromide of 1-(2-diethylaminoethoxy)anthraquinone crystallized and was purified by recrystallization from isopropanol, M.P. 212–213°.

*Example 2*

A solution of 17 g. of 2-(1-piperidyl)ethylchloride hydrochloride in 40 cc. of water was made alkaline with aqueous ammonia. The liberated base was extracted 3 times with 60 cc. portions of toluene. The toluene extract was dried over potassium carbonate. The filtered solution was added to a suspension of 17 g. of the sodium salt of 1-hydroxyanthraquinone in 100 cc. of toluene. The mixture was refluxed with stirring. After 8 hours, the solution was allowed to cool and was filtered. The filtrate was extracted with dilute hydrochloric acid. The hydrochloride of the amino ether crystallized soon. It was filtered and recrystallized from 150 cc. of water. The pure 1-[2-(1-piperidyl)ethoxy]anthraquinone hydrochloride melted at 248°.

5 g. of 1-[2-(1-piperidyl)ethoxy]anthraquinone hydrochloride were dissolved in water. The free base was liberated with ammonia and extracted with benzene. The benzene solution was evaporated and the free base was obtained as the residue.

The free base obtained above was dissolved in alcohol. After addition of 3 cc. of methyl iodide, the solution was allowed to stand for 2 days. The methiodide of 1-[2-(1-piperidyl)ethoxy]-anthraquinone was then filtered and recrystallized from methanol, M.P. 221–222°.

*Example 3*

15 g. of 2-(4-morpholinyl)ethyl chloride hydrochloride were dissolved in 20 cc. of water. The solution was cooled and saturated with potassium carbonate. The free base thus obtained was extracted repeatedly with toluene. The toluene solution (ca 200 cc.) was dried over potassium carbonate and filtered. The filtrate was added to a suspension of 9 g. of dry sodium salt of 1-hydroxyanthraquinone in 100 cc. of toluene. The mixture was refluxed for 12 hours. After cooling, it was filtered. From the filtrate the base was extracted with dilute hydrochloric acid. The acid extract was made alkaline with ammonia. The 1-[2-(4-morpholinyl)ethoxy]anthraquinone crystallized immediately. It was filtered and recrystallized from alcohol and melted at 115–117°.

4 g. of the base obtained above were dissolved in 100 cc. of hot alcohol. Alcoholic hydrochloric acid in excess was added. From the dark solution, the hydrochloride separated on cooling, M.P. 213–214°.

*Example 4*

16 g. of 2-dimethylaminoisopropyl chloride hydrochloride were dissolved in 30 cc. of water. The base was precipitated by addition of an excess of potassium carbonate and was extracted with 200 cc. of toluene. The solution was dried over potassium carbonate and was filtered. The filtrate was added to a suspension of 19 g. of the sodium salt of 1-hydroxyanthraquinone in 100 cc. of toluene. The mixture was refluxed for 15 hours. After cooling, the solution was filtered. The filtrate was extracted with dilute hydrochloride acid. The acid extract was made alkaline with ammonia. The 1-(2-dimethylaminoisopropoxy)anthraquinone precipitated as an oil which soon crystallized. It was recrystallized from 50% alcohol and melted at 41°.

6 g. of the base obtained above were dissolved in 50 cc. of alcohol. The solution was neutralized with alcoholic hydrochloric acid. The clear solution was diluted with ether. The 1-(2-dimethylaminoisopropoxy)anthraquinone hydrochloride crystallized, M.P. 196–197°.

Example 5

23 g. of 1-hydroxyanthraquinone were stirred wtih 300 cc. of xylene. A solution of 7 g. of potassium hydroxide in 25 cc. of water was added. The mixture was refluxed until no more water separated in the trap inserted below the condenser. A solution of 3-dimethylaminopropyl chloride, prepared from a concentrated aqueous solution of 18 g. of the hydrochloride with an excess of potassium carbonate and extraction with xylene, was added. The mixture was refluxed for 7 hours. After cooling it was filtered and extracted with dilute hydrochloric acid. The acid extract was made alkaline with ammonia. The 1-(3-dimethylaminopropoxy)anthraquinone separated in crystalline form. It was recrystallized from 50% alcohol and melted at 45°.

8 g. of the base obtained above were dissolved in 100 cc. of acetone. Upon addition of alcoholic hydrochloric acid, the hydrochloride separated immediately. The hydrochloride was recrystallized from isopropanol and melted at 197–198°.

3 g. of the base obtained above were dissolved in 20 cc. of methanol and 3 cc. of methyl iodide were added. After a few minutes the methiodide started to crystallize. It was filtered the following day. Recrystallization from ca 30 cc. of methanol yielded 3 g. of the pure methiodide of 1-(3-dimethylaminopropoxy)anthraquinone, M.P. 236–237°.

Example 6

20 g. of 3-diethylaminopropyl chloride hydrochloride were stirred up with 30 cc. of water. Excess ammonia was added and the base was extracted with toluene. The dried and filtered solution was added to a suspension of 25 g. of sodium salt of 1-hydroxyanthraquinone in toluene. The mixture was refluxed for 8 hours. After cooling, it was filtered, the filtrate was extracted with 3 N hydrochloric acid and the extract was diluted with acetone. The 1-(3-diethylaminopropoxy)anthraquinone hydrochloride crystallized on standing, M.P. 210–211°.

Example 7

24 g. of 1,2-dihydroxyanthraquinone were suspended in 300 cc. of xylene. At room temperature, a solution of 17 g. of potassium hydroxide in 35 cc. of water was slowly added with stirring. After complete addition, the mixture was refluxed until all the water was removed. The mixture was then allowed to cool to about 50–60°, and 28 g. of 2-diethylaminoethyl chloride were added. The mixture was then refluxed with stirring for 6 hours. After cooling, the solution was filtered. The filtrate was extracted repeatedly with dilute hydrochloric acid. The acid extract was made alkaline with ammonia and the 1,2-bis(2-diethylaminoethoxy)anthraquinone base was extracted with ether. Part of the material crystallized from ether and was filtered off (see Example 8 below). The ether solution was dried over potassium hydroxide and filtered. Alcoholic hydrochloric acid was added. On standing in the refrigerator the hydrochloride crystallized. It was filtered and recrystallized from 500 cc. of alcohol, yielding pure 1,2-bis(2-diethylaminoethoxy)anthraquinone dihydrochloride, M.P. 227°.

6.5 g. of the dihydrochloride obtained above were disolved in 50 cc. of water. The base was liberated with ammonia and was extracted with ether. The dried ether solution was evaporated and the free base 1,2-bis(2-diethylaminoethoxy)anthraquinone was obtained in residue.

The base was dissolved in acetone. Methyl iodide (6 cc.) was added. After standing overnight, the bis(methiodide) of 1,2-bis(2-diethylaminoethoxy)anthraquinone was filtered and dried. It melted at 230–231° and contained one mol of water of crystallization.

Example 8

The material which crystallized from the ether solution of the base in Example 7 was recrystallized from alcohol. The 1-hydroxy-2-(2-diethylaminoethoxy)anthraquinone thus obtained melted at 106–108°.

The hydrochloride, prepared in water, crystallized from aqueous solution and melted at 225–229°. The hydrobromide, prepared from an alcoholic solution of the base with alcoholic hydrobromic acid, melted at 225–226°.

5 g. of the base obtained above were dissolved in 100 cc. of methanol. 5 cc. of methyl iodide were added. On standing, the methiodide of 1-hydroxy-2-(2-diethylaminoethoxy)anthraquinone crystallized. It was recrystallized from water and melted at 228–229°.

Example 9

24 g. of 1,4-dihydroxyanthraquinone were stirred with 300 cc. of xylene. A solution of 15 g. of potassium hydroxide in 45 cc. of water was slowly added at room temperature. After complete addition, the mixture was refluxed with continuous stirring. When the water had been removed, the mixture was allowed to cool to about 80°. 28 g. of 2-diethylaminoethyl chloride were added and the mixture was refluxed for 7 hours. After cooling, the solids were filtered off and the filtrate was distilled to dryness in vacuo. The residue was extracted with dilute hydrochloric acid. From the acid extract, the base was liberated with ammonia and extracted with ether. The ether solution was distilled to dryness and the residue was stirred up with petroleum ether. On standing, crystals separated. They were filtered and washed with petroleum ether. The 1,4-bis(2-diethylaminoethoxy)anthraquinone melts at 60–61°.

5 g. of the base obtained above were dissolved in 40 cc. of alcohol and neutralized with alcoholic hydrochloric acid. The clear solution was diluted with an equal volume of ether. On standing, the hydrochloride crystallized. It was dissolved in 40 cc. of water, filtered, and diluted with 4 volumes of acetone. The pure 1,4-bis(2-diethylaminoethoxy)anthraquinone dihydrochloride melted at 235°.

5 g. of the base obtained above were dissolved in 150 cc. of acetone. After addition of 5 cc. of methyl iodide, the mixture was allowed to stand for 3 days. The methiodide was filtered and recrystallized from a mixture of 30 cc. of alcool and 60 cc. of methanol. The bis(methiodide) of 1,4-bis(diethylaminoethoxy)anthraquinone melted at 246.5–247.5°.

Example 10

24 g. of 1,4-dihydroxyanthraquinone were stirred with 300 cc. of xylene. A solution of 12 g. of potassium hydroxide in 40 cc. of water was slowly added. The mixture was then refluxed and the water was separated from the condensate by a trap. When the water had been removed, the free base, obtained from 37 g. of 2-dimethylaminoisopropyl chloride hydrochloride with potassium carbonate and extraction with 100 cc. xylene, was added and the mixture was refluxed for 6 hours. After cooling, the solution was filtered and the filtrate was distilled to dryness in vacuo. The residue was dissolved in chloroform and extracted with dilute hydrochloric acid. From the acid extract 1,4-bis(2-dimethylaminoisopropoxy)anthraquinone base was liberated with ammonia and extracted with ether. Addition of alcoholic hydrochloric acid precipitated the crude hydrochloride of the base obtained above. Recrystallization from isopropanol acetone (1:2) gave the pure hydrochloride of M.P. 217–219°. It contains one mol of water of crystallization.

5 g. of the dihydrochloride obtained above were converted into the base with ammonia. The 1,4-bis(2-dimethylaminoisopropoxy)anthraquinone was extracted with ether and distilled to dryness.

The free base obtained above was dissolved in 50 cc. of acetone and an excess of methyl iodide was added. On standing, the methiodide crystallized. Recrystallization from 120 cc. of methanol gave the pure bis(methiodide) of 1,4 - bis(2 - dimethylaminoisopropoxy)anthraquinone, M.P. 263–264°. It contains one mol of water of crystallization.

*Example 11*

24 g. of 1,4-dihydroxyanthraquinone were stirred with 300 cc. of xylene. A solution of 12 g. of potassium hydroxide in 40 cc. of water was slowly added. The solution was refluxed with a trap until the water was recovered. After cooling to about 60°, a solution of 3-dimethylaminopropyl chloride in xylene (prepared from its hydrochloride with potassium carbonate and extraction with 100 cc. of xylene) was added and the mixture was refluxed for 6 hours. The solution was filtered and distilled to dryness. The residue was dissolved in chloroform and extracted with dilute hydrochloric acid. The acid extract was made alkaline with ammonia and extracted with chloroform. The chloroform was distilled off and the residue was dissolved in alcohol. Alcoholic hydrobromic acid was added. On standing, the hydrobromide crystallized. It was recrystallized from alcohol isopropanol (1:2), yielding 1,4-bis(3-dimethylaminopropoxy)anthraquinone hydrobromide of M.P. 222–224°.

5 g. of the hydrobromide obtained above were converted into the free base with ammonia. The base was extracted with ether and the ether was distilled off.

The free base obtained as residue above was dissolved in acetone and an excess of methyl iodide was added. On standing, the methiodide crystallized. Recrystallization from about 500 cc. of alcohol gave the pure bis(methiodide) of 1,4-bis(3-dimethylaminopropoxy)anthraquinone of M.P. 220–222°.

*Example 12*

25 g. of 1,5-dihydroxyanthraquinone and 30 g. of potassium hydroxide were stirred and heated in 1000 cc. of water. The potassium salt dissolved only partially. The hot solution was filtered and distilled to dryness. The residue was stirred up with 500 cc. of alcohol and filtered by suction. The potassium salt was dried to constant weight over potassium hydroxide in a desiccator.

35 g. of the potassium salt obtained above were suspended in 300 cc. of toluene with stirring and 30 g. of 2-diethylaminoethyl chloride were added. After cooling, the solution was filtered and distilled to dryness. The residue was recrystallized from benzene, yielding the base 1,5 - bis(2 - diethylaminoethoxy)anthraquinone, of M.P. 126°.

5 g. of the base obtained above were neutralized in 50 cc. of alcohol with alcoholic hydrochloric acid. The hydrochloride was recrystallized from alcohol, yielding the pure compound of M.P. 250°. It contained one-half mol of water of crystallization.

6 g. of the base obtained above and 5 cc. of methyl iodide were dissolved in 50 cc. of alcohol. On standing, the bis(methiodide) of 1,5-bis(2-diethylaminoethoxy)anthraquinone crystallized. It was recrystallized from methanol and melted at 267°.

*Example 13*

24 g. of 1,5-dihydroxyanthraquinone were stirred with 300 cc. of xylene. A solution of 12 g. of potassium hydroxide in 40 cc. of water was slowly added. The mixture was refluxed until the water had been separated from the condensate. After cooling to about 50°, 3-diethylaminopropyl chloride (prepared by neutralizing 40 g. of its hydrochloride with an excess of potassium carbonate and extracting with 100 cc. of xylene) was added and the mixture was refluxed for 8 hours. The solution was filtered and extracted with dilute hydrochloric acid. The base, 1,5-bis(3-diethylaminopropoxy)anthraquinone, was liberated from the acid extract with ammonia and was extracted with ether. The dried ether solution was neutralized with alcoholic hydrochloric acid. The hydrochloride separated and was recrystallized from about 400 cc. of alcohol, yielding pure 1,5-bis(3-diethylaminopropoxy)anthraquinone hydrochloride, M.P. 221–222°.

*Example 14*

24 g. of 1,5-dihydroxyanthraquinone were stirred with 350 cc. of xylene. A solution of 12 g. of potassium hydroxide in 400 cc. of water was slowly added. The mixture was refluxed until the water was entirely separated from the condensate by a trap. After cooling to about 70°, the free base (prepared from 37 g. of dimethylaminoisopropyl chloride hydrochloride with potassium carbonate and extraction with 100 cc. of xylene) was added. The mixture was refluxed for 7 hours, cooled to 30° and filtered. The filtrate was distilled to dryness and the residue was dissolved in ether. On addition of alcoholic hydrochloric acid the hydrochloride crystallized slowly. It was purified by crystallization from a mixture of 300 cc. of isopropanol and 600 cc. of acetone. The 1,5-bis(2-dimethylaminoisopropoxy)anthraquinone hydrochloride melted at 236–238° and contained one-half mol of water of crystallization.

*Example 15*

24 g. of 1,8-dihydroxyanthraquinone were suspended in 300 cc. of xylene. A solution of 12 g. of potassium hydroxide in 40 cc. of water was slowly added with stirring. The mixture was refluxed until the water in the condensate was removed by a trap. After cooling to about 80°, 30 g. of 2-diethylaminoethyl chloride were added and the mixture was refluxed for about 8 hours. After cooling, it was filtered. From the filtrate the base was extracted with dilute hydrochloric acid. The free base, 1,8-bis(2-diethylaminoethoxy)anthraquinone, was liberated with ammonia and extracted with ether. The dried ether solution was neutralized with alcoholic hydrochloric acid. The hydrochloride crystallized slowly and was filtered after one day. Recrystallization from 600 cc. of alcohol and 1200 cc. of acetone yielded pure 1,8-bis(2-diethylaminoethoxy)anthraquinone hydrochloride, M.P. 237–239°.

5 g. of the hydrochloride obtained above were dissolved in water and made alkaline with dilute sodium hydroxide. The free base was extracted with ether. The ether was distilled off and the residue was recrystallized from isopropanol. The pure base thus obtained melted at 73–75°.

3 g. of the base obtained above were dissolved in 30 cc. of methanol and 15 cc. of a 14% solution of methyl bromide in methanol were added. After standing for 3 days ether was added. The bis(methobromide) of 1,8-bis-(2-diethylaminoethoxy)anthraquinone separated and was recrystallized from about 200 cc. of isopropanol. It melted at 248–250°.

5 g. of the hydrochloride obtained above were converted into free base with ammonia and extracted with ether. The ether solution was distilled to dryness. The residue was dissolved in acetone and 5 cc. of methyl iodide were added. After standing overnight, the methiodide was filtered and recrystallized from 100 cc. methanol plus 200 cc. ethanol. The pure compound melted at 234–236°. It contained one mol of water of crystallization.

*Example 16*

27 g. of 1,8-dihydroxyanthraquinone and 30 g. of potassium hydroxide were stirred for 2 hours in 400 cc. of water. The solid monosodium salt of 1,8-dihydroxyanthraquinone was filtered off and dried in a desiccator.

26 g. of the potassium salt of 1,8-dihydroxyanthraquinone were stirred with 300 cc. of toluene. After addition of 15 g. of 2-diethylaminoethyl chloride, the mixture was refluxed for 8 hours. The solution was filtered and extracted with 2% hydrochloric acid. On standing, crystals of the hydrochloride separated. The 1-hydroxy-8 - (2 - diethylaminoethoxy)anthraquinone hydrochloride was recrystallized from about 300 cc. of water, M.P. 241–242°.

5 g. of the hydrochloride obtained above were dissolved in water and neutralized with ammonia. The base, 1-hydroxy-8-(2-diethylaminoethoxy)anthraquinone, was extracted with ether and distilled to dryness.

The free base was dissolved in 60 cc. of alcohol. After addition of 3 cc. of methyl iodide, the solution was allowed to stand overnight. The methiodide was filtered and recrystallized from about 200 cc. of methanol, M.P. 228°.

*Example 17*

24 g. of 1,8-dihydroxyanthraquinone were suspended in 300 cc. of xylene. A solution of 12 g. of potassium hydroxide in 40 cc. of water was added with stirring. The mixture was refluxed until the water had been removed completely by a trap from the condensate. After cooling to 50°, a solution of 3-dimethylaminopropyl chloride (prepared by neutralizing 37 g. of its hydrochloride with ammonia and extracting with 100 cc. of xylene) was added. The mixture was refluxed with stirring for 7 hours. After cooling, the solution was filtered and extracted with dilute hydrochloric acid. The acid extract was made alkaline with ammonia and the base, 1,8-bis-(3-dimethylaminopropoxy)anthraquinone, was extracted with ether. Addition of alcoholic hydrochloric acid precipitated the hydrochloride which was filtered after standing overnight. Recrystallization from isopropanol and from alcohol benzene gave pure 1,8-bis(3-dimethylaminopropoxy)anthraquinone hydrochloride, M.P. 213–216°. It contains 1 mol of water of crystallization.

*Example 18*

24 g. of 1,8-dihydroxyanthraquinone were stirred with 300 cc. of xylene. A solution of 12 g. of potassium hydroxide in 50 cc. of water was slowly added. The mixture was refluxed until the water was removed from the condensate. A solution of 2-dimethylaminoisopropyl chloride (prepared from 37 g. of the hydrochloride with ammonia and extraction with 100 cc. of xylene) was added and the mixture was refluxed for 7 hours. After cooling, the solution was filtered and distilled to dryness. The residue was dissolved in ether, filtered and neutralized with alcoholic hydrochloric acid. The 1,8-bis(2-dimethylaminoisopropoxy)anthraquinone hydrochloride crystallized slowly. After recrystallization from isopropanol, it melted at 230–231°. It contains one-half mol of water of crystallization.

4 g. of the hydrochloride obtained above were converted into the free base, 1,8-bis(2-dimethylaminoisopropoxy)anthraquinone, with ammonia. The base was extracted with ether and the ether solution was distilled to dryness.

The free base obtained above was dissolved in acetone. After addition of 4 cc. of methyl iodide, the mixture was allowed to stand for 3 days. The crystals which formed were filtered and recrystallized from 260 cc. isopropanol and 40 cc. water. The bis(methiodide) of 1,8-bis(2-dimethylaminoisopropoxy)anthraquinone contains 1 mol of water of crystallization, M.P. 251.5–253°.

*Example 19*

24 g. of 1,4-dihydroxyanthraquinone were stirred with 200 cc. of xylene. A solution of 6 g. of potassium hydroxide in 20 cc. of water was added. The mixture was refluxed and the water was removed from the condensate by means of a trap. When no more water separated, a solution of 14 g. of 2-dimethylaminoisopropyl chloride in 100 cc. of xylene was added and the mixture was refluxed for 10 hours. After cooling, it was filtered and the filtrate was extracted with dilute aqueous hydrochloric acid. From the acid extract the base was liberated with ammonia and extracted with benzene. The benzene solution was then distilled to dryness. The residue was dissolved in 100 cc. of acetone and the solution was filtered. Alcoholic hydrobromic acid (5%) was added until the solution was acid to Congo red paper. The 1 - hydroxy - 4 - (2 - dimethylamino - isopropoxy)-anthraquinone hydrobromide crystallized slowly. It was recrystallized from boiling alcohol, M.P. 231–232°.

*Example 20*

48 g. of 1,4-dihydroxyanthraquinone was stirred in a 5 liter flask with 1000 cc. of xylene. A solution of 23 g. of potassium hydroxide in 60 cc. of water was added slowly at room temperature. When the alkali had been added, the mixture was refluxed with a trap until all the water was separated. To the suspension of the potassium salt was then added a solution of 56 g. of 2-dimethylaminoisopropyl chloride in 200 cc. of xylene and the mixture was refluxed for 10–15 hours. After cooling the solids were filtered and the filtrate was distilled to dryness. The oily residue was dissolved in dilute aqueous hydrobromic acid and the acid solution was again filtered. It was then evaporated to dryness. The residue was stirred with 400 cc. of M-butanol for several hours. The 1,4-bis-(dimethylaminoisopropoxy)anthraquinone dihydrobromide crystallized and was filtered. It was purified by recrystallization from alcohol, M.P. 241–242°.

I claim:

1. A base selected from the group represented by the formula

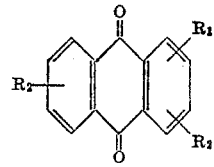

wherein $R_1$ represents a member of the group consisting of diloweralkylamino lower alkoxy and monoheterocyclic lower alkoxy wherein the heterocyclic group is a 5 to 6 member nitrogen heterocyclic and $R_2$ represents a member of the group consisting of hydrogen, diloweralkylamino lower alkoxy and monoheterocyclic lower alkoxy wherein the heterocyclic group is a 5 to 6 member nitrogen heterocyclic, at least one $R_2$ representing hydrogen, and pharmaceutically acceptable acid addition and quaternary ammonium salts of said bases.

2. A compound represented by the formula

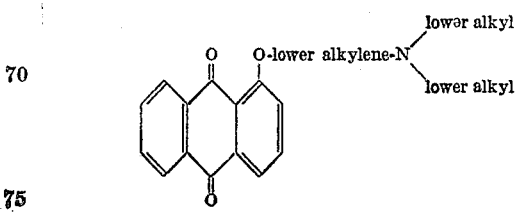

3. A compound represented by the formula

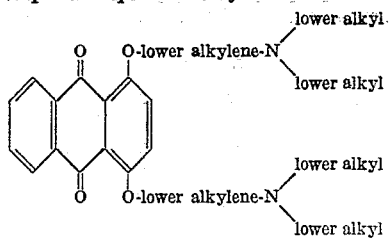

4. A compound represented by the formula

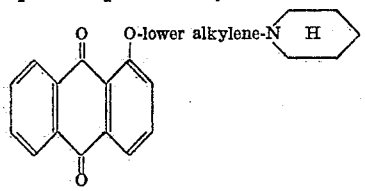

5. A compound represented by the formula

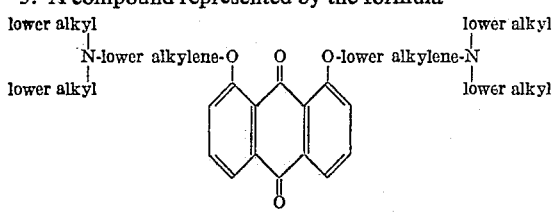

6. A compound represented by the formula

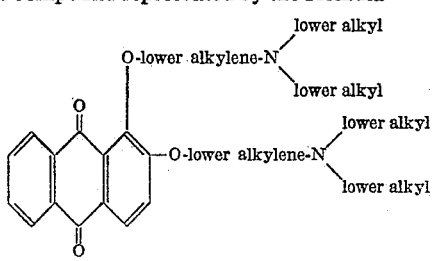

7. 1-[2-(1-piperidyl)-ethoxy]anthraquinone.
8. 1,4-bis-(2-dimethylaminoisopropoxy)anthraquinone.
9. 1,4 - bis - (2 - dimethylaminoisopropoxy)anthraquinone hydrochloride.
10. 1,4-bis-(3-dimethylaminopropoxy)anthraquinone.
11. 1,8-bis-(2-diethylaminoethoxy)anthraquinone.
12. A compound represented by the formula

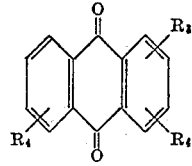

wherein $R_3$ represents a member of the group consisting of diloweralkyl amino lower alkoxy and monoheterocyclic lower alkoxy wherein the heterocyclic group is a 5 to 6 member nitrogen heterocyclic, one $R_4$ represents hydrogen and the other $R_4$ represents hydroxy.

13. 1 - hydroxy - 2 - (2 - diethylaminoethoxy)anthraquinone.
14. 1 - hydroxy - 8 - (2 - diethylaminoethoxy) anthraquinone.
15. A compound represented by the formula

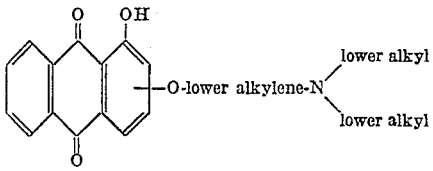

16. 1,8 - bis - (3 - dimethylaminopropoxy)anthraquinone.
17. 1,8 - bis - (3 - dimethylaminopropoxy)anthraquinone hydrochloride.

References Cited in the file of this patent
UNITED STATES PATENTS
2,737,517   Boyd _____ Mar. 6, 1956